United States Patent [19]

Collins

[11] 4,070,761

[45] Jan. 31, 1978

[54] PRINTING PRESS WITH INVENTORY CONTROL

[75] Inventor: Joseph Martin Collins, Ontario, N.Y.

[73] Assignee: Burroughs Corporation, Detroit, Mich.

[21] Appl. No.: 687,807

[22] Filed: May 19, 1976

[51] Int. Cl.[2] .................................................. G01B 5/08

[52] U.S. Cl. .................................................. 33/172 F

[58] Field of Search ................ 33/172 F; 242/187, 57, 242/67.5, 75.45; 116/67 A; 101/219, DIG. 21

[56] References Cited

U.S. PATENT DOCUMENTS

| | | | |
|---|---|---|---|
| 408,094 | 7/1889 | Fowler et al. | 101/DIG. 21 |
| 1,090,128 | 3/1914 | Avers | 33/172 F |
| 1,272,671 | 7/1918 | Jonson | 33/172 F |

*Primary Examiner*—Richard E. Aegerter
*Assistant Examiner*—Willis Little
*Attorney, Agent, or Firm*—Kevin R. Peterson; William B. Penn; Lynn L. Augspurger

[57] ABSTRACT

Disclosed is a printing press of the rotary offset or rotogravure web feed type having an arbour mounted feed roll from which paper to be printed is drawn. The press is equipped with a constant inventory follower of the feed roll such that at any time the inventory of the remaining paper stock can be taken.

7 Claims, 6 Drawing Figures

PRINTING PRESS WITH INVENTORY CONTROL

BACKGROUND OF THE INVENTION

This invention is related to printing presses of the type which are used for printing on continuous webs drawn from a feed roll, and particularly to one equipped with a constant inventory follower so as to provide a running inventory for paper rolls.

Prior art web presses, such as those of the rotogravure or rotary offset type have large feed stock rolls from which the paper is drawn from inventory. The amount of paper remaining on the roll, or the butt end, constitutes the remaining inventory. Large printers have many of these rolls and maintaining proper inventory control of available paper stock is a time-consuming and important problem for the printer.

SUMMARY OF THE INVENTION

The purpose of this invention is to provide a rotary offset or rotogravure press, or similar press having a web reed from supply roll with a constant inventory follower and recorder.

The invention provides a roll diameter indicator which indexes visually the roll providing a visual report of the position of a follower roller. The follower roller thus follows the outermost layer of the paper remaining on the feed stock roll to provide the most accurate tally of the amount of paper remaining in stock, and also normally triggers a bell to alert the pressmen to a depleting roll of paper.

BRIEF DESCRIPTION OF THE DRAWINGS

The above and other objects, advantages and features of the present invention will become more readily apparent from a review of the following description when taken in relation to the drawings wherein.

GENERAL DESCRIPTION OF THE INVENTION

Figure 1:
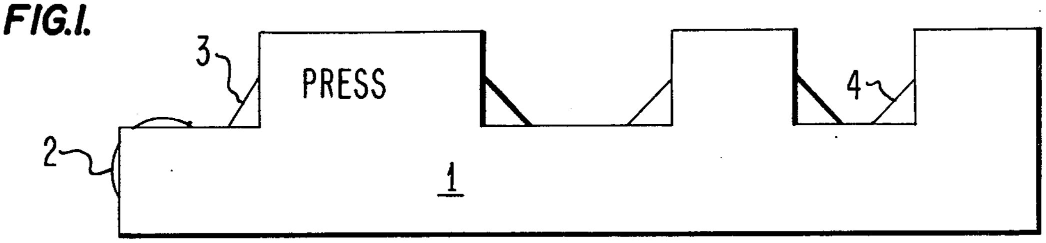
FIG. 1 is an elevation of a press equipped with the invention.

Turning now to FIG. 1, it will be seen that the printing press 1 has at one end a supply roll 2 from which a web 3 of paper stock is drawn and passed through the press 1 until the printed paper is finally returned to a wind up roll at the end of the press 1.

Figure 2:
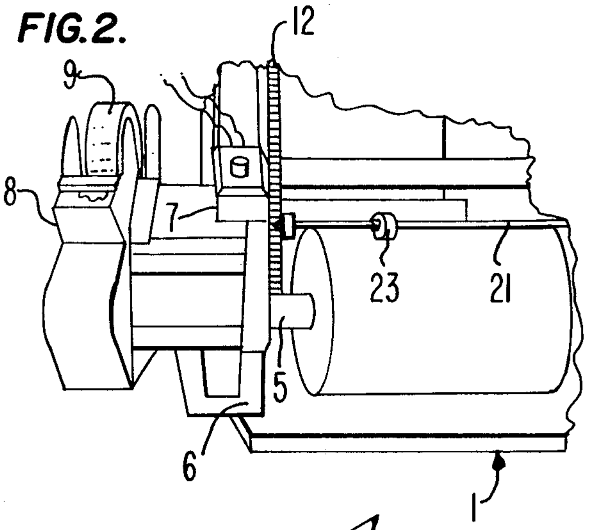
FIG. 2 is a perspective view of the press equipped with the invention showing the portion thereof which has the constant inventory follower.

As will be seen in FIG. 2, the supply roll 2 can be unwound from the bottom or top (dotted lines) when mounted on a support arbour 5 which is journaled in the frame 6 of the press 1.

From the position of view the supply roll may be moved to the left or right by suitable depression of keys on a control panel 7.

Figure 3:
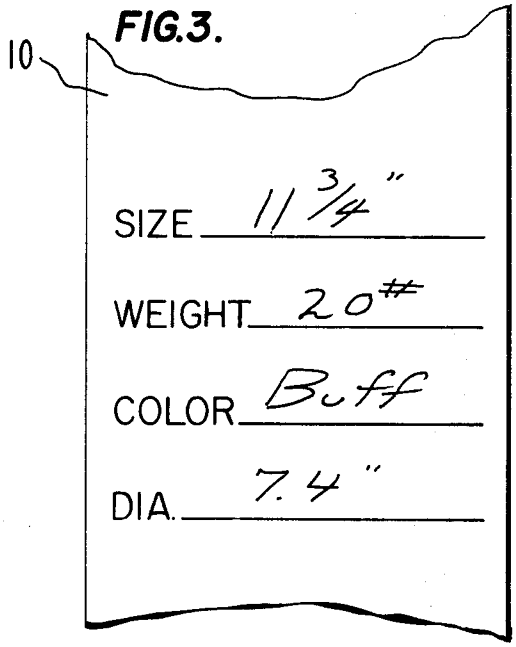
FIG. 3 is a plan view of the binder tape utilized in connection with the recordal of the inventory.

Mounted on the frame adjacent to the control panel and the supply roll is a tape dispenser unit 8 which has a roll of preprinted inventory tape 9 mounted therein and journaled so that it can be withdrawn from the throat of the dispenser 8 from which it can be torn to provide a label 10, see FIG. 3 which serves a dual purpose. The label is gummed and acts as the fastener of the free end of a roll butt when the butt end of the supply roll has been removed from the arbour 5 at the completion of the run. The label 10 is preprinted with a place to insert SIZE, WEIGHT, COLOR AND REMAINING DIAMETER.

This label provides the key control for the inventory in the printing plant. Butt rolls are stacked on end. The SIZE, WEIGHT, COLOR AND REMAINING DIAMETER label is readily viewed as these inventory rolls are stacked about the plant, and the totals can be visually verified with little effort, for audit and inventory purposes.

Figure 5:
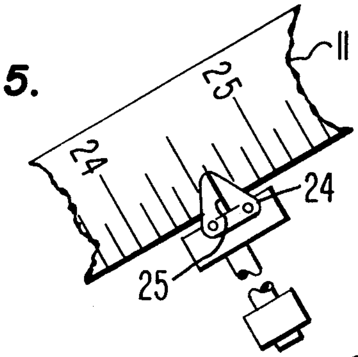
FIG. 5 is a plan view of the follower and pointer portion of the constant inventory follower.
Figure 4:
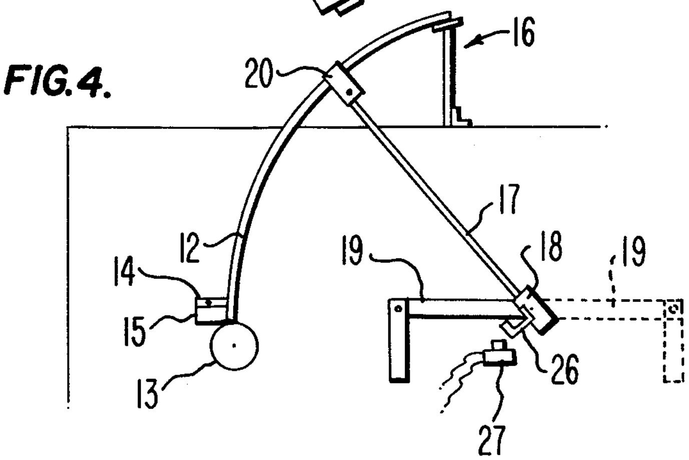
FIG. 4 is a schematic section of the press equipped with the constant inventory follower when the roll shown in FIG. 2 is removed.
Figure 6:
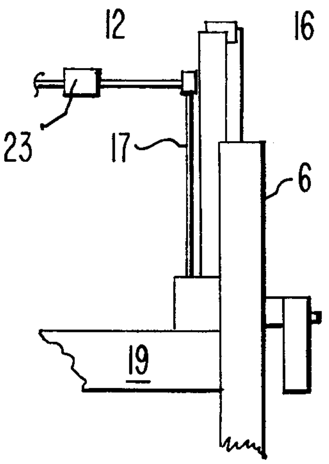
FIG. 6 is a schematic plan view of the constant inventory follower shown in FIG. 4 taken along line 6—6.

The entries which are made to this label, such as those shown in FIG. 3 are taken by the pressman from the readout of the indicator shown in FIG. 5. This readout is accomplished by utilization of the constant inventory follower mechanism shown in FIGS. 2, 4, 5 and 6.

The constant inventory follower is used to measure roll diameter. A scale 11 is affixed to an arcuate guide 12 which is mounted on the frame 6 of the printing press 1. This arcuate guide 12 has its lower end affixed adjacent the point of arbour journal 13 by means of a bracket 14 which is fastened to the frame by suitable fastening means, such as a bolt 15. At the upper end the arcuate guide 12 is affixed to the frame as well by a bracket, such as bracket 16, also bolted to the frame 6. The arc of the scale arcuate guide 12 is determined by the maximum roll diameter utilized on the press.

If, for instance, the rolls are 30 inches in diameter, the guide has an arc radius which will accommodate a numerical scale of 30 inches. The arc radius also corresponds to the length of the paper follower support arm 17 which is mounted on the frame 6 and journaled to pivot about a point precisely at the center of the arc. This center journal point 18, also is the pivot of an interconnected counterbalance 19. The counterbalance is weighted to cause the index end 20 of the support arm to move toward the arbour journal point, however, for set up, the counterweight can be flipped to the opposite side, as shown so as to cause the follower to raise and permit ready loading of the supply roll 2 on the arbour 5.

The index end of the follower arm 17, has connected thereto, a cantilevered crossbar 21, on which there are journaled one or more paper roll follower rollers 23. The journals of these rollers are movable to allow for centering the rollers, along the crossbar 21, for different widths of paper rolls. One side of the follower arm end has a pointer 24 on which an inscribed line 25 has been made to precisely mark on the scale 11 the position of the follower arm 17.

Accordingly, the constant inventory follower acts as a roll diameter indicator by providing a visual readout of the position of a roll follower on the scale which scale is calibrated to follow the actual paper roll diameter. When the follower arm lowers to a point near the end of its travel, the foot 26 presses a switch 27 to alert the pressman, such as by an electric buzzer, that the roll of paper is depleted.

The exact paper usage on the job is recorded by the pressman, as he removes the paper roll from the press for return to stock. He reads the roll diameter, records this on the custom tape label 10, removes the roll, and sticks the tape to the butt end stock to prevent unwinding and for verifying copy tape can be utilized in the dispenser 8 so that besides furnishing the label actually used to bind the stock from unwinding and for providing audit information, the duplicate can be forwarded directly to inventory control.

Roll diameter is there easily converted to yardage when paper weight is known. If only one paper weight is commonly used it is possible to calibrate the press scale 12 directly in yardage. Therefore, purchase quantities, run usage, and remaining quantities of paper are accurately tallied. No annular physical inventory is required. Strip off wastes can be determined, and the exact amount of paper used in any run can be derived from start/stop readout of the constant inventory follower or mileage meter on the printing press itself.

While the preferred embodiment of the invention has been shown in detail and described with reference to the prior art known to me, various modifications and rearrangements may be made in the product and process of making the same as may occur to those skilled in the art both now and in the future, the scope of my invention is to be determined with reference to the following claims.

What is claimed is:

1. A web printing press comprising:

a frame;

a print and wind station;

a load roll station;

a spindle disposed in said load roll station and journaled in said frame for mounting a supply roll of paper to feed the press;

scale means disposed in a plane substantially perpendicular to the axis of said spindle and structurally extending from said spindle to the maximum radius of a supply roll mounted on said spindle;

indicia carried by said scale means and visually displayed thereon between said spindle and a radial distance of at least the maximum radius of the roll; and monitoring means conjointly cooperating with both the outer circumferential surface of the roll and said scale means, said cooperation occurring substantially along the cylindrical plane defined by the outer circumferential surface of the roll, and said monitoring means transducing the radius of the roll into a visual indication thereof.

2. Apparatus according to claim 1 wherein said monitoring means comprises:

a bar member extending along the surface of the roll parallel to the roll axis;

a surface contact member mounted on said bar member and contacting the exterior surface of the roll; and a pointer coaxially contected to said bar member and cooperating with said indicia of said scale means for providing a visual indication of the radius of the roll.

3. Apparatus according to claim 1 wherein said indicia is structurally oriented for providing visual radius indications to viewing positions on planes substantially parallel to the axis of said spindle.

4. Apparatus according to claim 3 wherein said scale means forms a circular arc extending from said spindle to the maximum radius of a supply roll mounted on the spindle.

5. Apparatus according to claim 4 wherein said monitoring means further comprises a lever member of length at least equal to the radius of said arc and pivotally mounted along the central axis of said arc, said lever member rotatable in a plane substantially parallel to the plane of said arc; and an indicator portion carried by said lever member and cooperating with said indicia of said scale means for transducing the radius of the roll into a visual indication thereof.

6. Apparatus according to claim 5 wherein said monitoring means further comprises a roll surface contact member contacting the exterior circumference of the roll, said contact member connected to said indicator portion.

7. Apparatus according to claim 6 and further comprising:

a multi-positional counterbalance means connected to said lever member, said counter balance means increasing said contacting of said surface contact member with the exterior surface of the roll when in a first position, and said counter balance means disengaging said surface contact member from the exterior surface of the roll when in a second position.

* * * * *